Sept. 18, 1956　　　　　G. C. LASTER　　　　　2,763,047
PIPE JOINT COATER
Filed Oct. 15, 1951
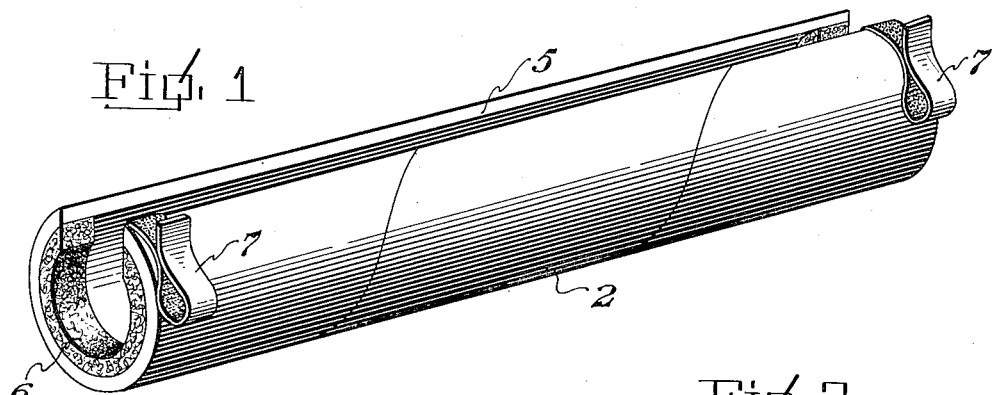
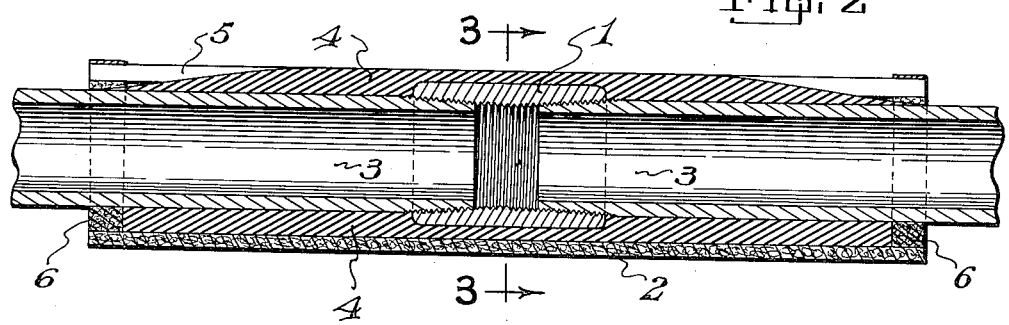
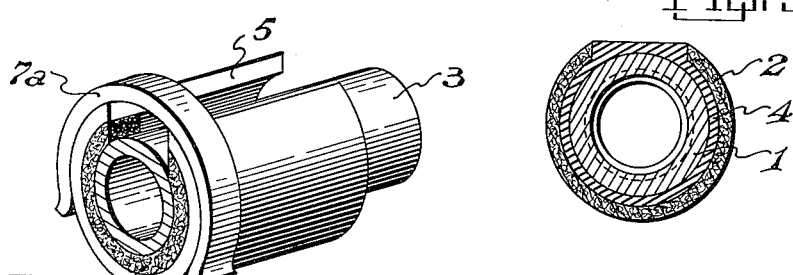
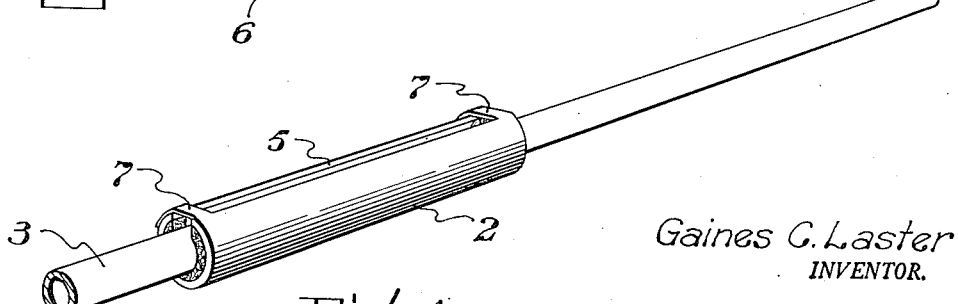
Gaines C. Laster
INVENTOR.
BY
ATTORNEY United States Patent Office 2,763,047
Patented Sept. 18, 1956

2,763,047

PIPE JOINT COATER

Gaines C. Laster, Tulsa, Okla.

Application October 15, 1951, Serial No. 251,374

4 Claims. (Cl. 25—127)

The invention relates to pipe joint coating devices, and has for its object to provide a mold split longitudinally on one side, and adapted to encircle a pipe joint and contain liquid or plastic coating material poured into the mold through the split side thereof as the coating material solidifies. Also to form the mold from a non-metallic substance, for instance pulp or heavy paper, which material is comparatively cheap, so that the mold can be left on the joint and the material will not be subject to electrolytic action, and at the same time the coated joint will not be subject to electrolytic action.

A further object is to provide the ends of the split mold with non-metallic dams for containing the material and the ends of the split mold with means arching the split for holding the inner peripheries of the dams in tight contact with adjacent pipe ends, thereby preventing the mold from dropping downwardly incident to the weight of the plastic material poured into the mold.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the mold.

Figure 2 is a vertical longitudinal sectional view through a conventional form of pipe joint, showing the mold in longitudinal section and plastic material therein.

Figure 3 is a vertical transverse sectional view taken on line 3—3 of Figure 2.

Figure 4 is a perspective view of a pipe showing the mold applied and ready for the filling operation.

Figure 5 is a detail perspective view showing a modified form of clip for the mold end.

The present device is particularly adapted for use in coating pipe joints of large pipes of the type used in oil and gas fields. The main bodies of many of these pipes are coated before they reach the field, however the thread difficulty of pre-coating hinders the connecting of the pipes by the coupling 1. It is desirable to coat the joints and pipes to prevent corrosion and electrolytic action. The present mold is formed from a non-metallic material such as pulp board or other fibrous material, which is cheap, and the mold, as a whole, is left in position after the joint coating operation.

The mold comprises an elongated body 2 of larger interior diameter than the exterior diameter of the pipe ends 3 and the coupling 1, so that when the device is forced laterally on the pipe, an annular chamber is formed around the pipe ends and coupling and into which chamber a mastic material 4 is poured through the longitudinal opening 5 in the upper side of the member 2. Disposed within the ends of the cylindrical member 2 are semi-circular fibrous dams 6, the open sides of which register with the longitudinal opening 5 in the body 2. The device is forced laterally over the pipe ends as there is sufficient flexibility to the material to allow spreading. After the mold has been placed on the pipe joint the ends are squeezed together and the adhesive tapes 7 are stretched across the ends of the opening 5 and stuck to the adjacent side of the body 2, clearly shown in Figure 4, therefore it will be seen that the inner peripheries of the dams 6 will closely hug the peripheries of the pipe ends.

After the mold has been placed in position, mastic or other plastic sealing material is poured through the longitudinal opening 5 into the mold, and it will flow downwardly and entirely encircle the pipe joint. As the filling operation approaches the full position, shown in Figure 2, the ends of the portion in the longitudinal opening 5 will naurally flow to the tapered shape shown in Figure 2. Various kinds of sealing and plastic materials are used, and of different consistency, however the type used hardens to about the consistency of tar. In this connection, it will be understood that any type of coating material may be used.

Referring to Figure 5, the construction and operation is the same as shown in Figures 1 and 2, however instead of the adhesive closing strips 7, U-shaped spring clips 7a are used for holding the ends of the mold. These clips may be made of cheap plastic material.

By forming the device from pulp material or other non-metallic material not only is electrolytic action reduced to a minimum, but at the same time the joint is protected from the same action, and the mold cheaply manufactured so it can be left on the joint and buried with the pipe.

The invention having been set forth what is claimed as new and useful is:

1. A pipe joint mold adapted to encircle a pipe joint and receive a plastic material therein, said mold comprising an elongated non-metallic cylindrical body having limited flexibility, said body having a longitudinal opening at one side thereof, said opening extending throughout the body and through the ends thereof, said body being adapted to receive a pipe joint when the joint is forced laterally through the opening and to contract incident to its flexibility after the joint is forced therein, the internal diameter of said body being greater than the external diameter of said joint to provide a radial space between the inner surface of the body and the outer surface of the joint, the inner periphery of the flexible non-metallic body at its ends being provided with circular dams formed of non-metallic material and adapted to contractably engage the joint periphery, the ends of the opening of the body being provided with flexible non-metallic adhesive tabs adapted to arch the ends of the opening and be secured adhesively to the ends of the body for holding said body contracted and the dams in engagement with the outer surface of the joint to close off the ends of the body.

2. In a pipe molding apparatus for sealing a straight coupling of connected pipe sections which comprises a tubular one-piece body member adapted to substantially encircle the coupling, said body member of non-metallic flexible material and having a longitudinal slot extending throughout the length thereof, said body member disposed around the coupling to affect radial spacing between the outside diameter of the coupling and the inside diameter of the body member for providing a chamber therebetween, unitary means for closing the ends of the body and maintaining the body in spaced relationship with the coupling to permit pouring of molten enamel fluid into the chamber for completely covering the coupling, and means on the ends of said body for maintaining the body member around the pipe.

3. A mold adapted to encircle a pipe joint for receiving plastic material for sealing the joint and comprising a tubular body having a longitudinal slot extending throughout the length thereof, said body being of a non-metallic material characterized by having limited flexibility to permit spreading and contraction of the longitudinal slot, said body having an inside diameter of greater diameter than the outside diameter of the pipe joint to be inserted therein in order to facilitate insertion of the pipe transversely through the slot in spread condition and into the mold and to provide an annular chamber adjacent the joint for receiving a plastic material therein, said slot in communication with the annular chamber to permit flow of plastic material therein, an arcuately shaped non-metallic annular dam of substantially the same radial width as the annular chamber rigidly secured to the inner periphery and conterminous with the outer extremities of the body, said dams adapted to engage the outer periphery of the pipe for retention of the plastic material within the chamber, a flexible adhesive non-metallic tab provided adjacent the slot at each end of the body and adapted to span the width of the slot and secure the body in a tubular configuration around the pipe joint.

4. In a pipe molding apparatus for sealing a straight coupling of connected pipe sections which comprises a one-piece body member adapted to substantially encircle the coupling, said body member of non-metallic flexible material and having a longitudinal slot extending throughout the length thereof, said body member disposed around the coupling to affect radial spacing between the outside diameter of the coupling and the inside diameter of the body member for providing a chamber therebetween, unitary means for closing the ends of the body and maintaining the body in spaced relationship with the coupling to permit pouring of molten enamel fluid into the chamber for completely covering the coupling, and means on the ends of said body for maintaining the body member around the pipe.

References Cited in the file of this patent

UNITED STATES PATENTS

| | | |
|---|---|---|
| 471,894 | Raymond | Mar. 29, 1892 |
| 771,911 | Johnson | Oct. 11, 1904 |
| 1,292,010 | Monrath | Jan. 21, 1919 |
| 1,709,844 | Durant | Apr. 23, 1929 |
| 1,722,324 | Deming | July 30, 1929 |
| 1,941,299 | Greenidge | Dec. 26, 1933 |
| 2,119,415 | Bodge | May 31, 1938 |
| 2,180,810 | Keegan | Nov. 21, 1939 |
| 2,505,426 | O'Flaherty | Apr. 25, 1950 |